United States Patent [19]

Chambers et al.

[11] 3,967,181

[45] June 29, 1976

[54] CONVERTER WHEREIN SWITCHING FREQUENCY IS INDEPENDENT OF OUTPUT VOLTAGE AND IS SYNCHRONIZED TO AN EXTERNAL SYSTEM

[75] Inventors: Derek Chambers, Framingham, Mass.; A. Leonard Harley, Norwalk, Conn.

[73] Assignee: Raytheon Company, Lexington, Mass.

[22] Filed: Jan. 24, 1974

[21] Appl. No.: 436,307

Related U.S. Application Data

[62] Division of Ser. No. 34,932, May 6, 1970, Pat. No. 3,818,128.

[52] U.S. Cl. .................................. 321/2; 321/18; 323/17
[51] Int. Cl.² ............................................ H02M 5/456
[58] Field of Search ............ 321/2, 18; 323/DIG. 1, 323/17

[56] References Cited
UNITED STATES PATENTS

| 3,350,620 | 10/1967 | Barron | 321/2 |
| 3,443,194 | 5/1969 | Cielo | 323/DIG. 1 |
| 3,585,491 | 6/1971 | Petersen | 321/2 |
| 3,761,796 | 9/1973 | Jensen | 321/2 |
| 3,806,791 | 4/1974 | Johnson | 321/2 |
| 3,818,306 | 6/1974 | Marini | 323/DIG. 1 |
| 3,839,668 | 10/1974 | Black | 321/21 |
| 3,914,679 | 10/1975 | Sullivan | 321/2 |

Primary Examiner—Gerald Goldberg
Attorney, Agent, or Firm—David M. Warren; Joseph D. Pannone; Milton D. Bartlett

[57] ABSTRACT

A display and power supply system in which the power assembly uses a switching frequency which is higher than the highest linear deflection rate used in a cathode ray tube display device supplied by the power supply and in which the frequency of the power supply and the information repetitively displayed on the display are synchronized to eliminate interference of the power supply frequency with the display characteristics.

2 Claims, 7 Drawing Figures

CONVERTER WHEREIN SWITCHING FREQUENCY IS INDEPENDENT OF OUTPUT VOLTAGE AND IS SYNCHRONIZED TO AN EXTERNAL SYSTEM

This is a division of application Ser. No. 34,932 filed May 6, 1970, now U.S. Pat. No. 3,818,128.

REFERENCE TO RELATED APPLICATIONS

Application Ser. No. 19,190, filed Mar. 13, 1970 now U.S. Pat. No. 3,697,955, of Joseph E. Bryden, titled Visual Display System and assigned to the same assignee as this application is hereby incorporated by reference.

SUMMARY OF THE INVENTION

Power supplies of the prior art for display systems such as radar displays, sonar displays, television displays, and particularly computer terminal displays of the digital type in which characters are repetitively displayed on the screen of a cathode ray tube have in the past presented a problem in that such power supplies have inherently produced some degree of interference with the display system since, to be efficient, switching or chopping of one form or another of the input voltage must be employed, which will result in the production of voltage spikes which in the past have interfered with the data display, producing jitter, fading, bright spots, masking, or even loss of information.

Voltage spikes in a power supply produce objectionable results, such as jitter, by reason of the spike causing variation of the high voltage of, for example, 10 to 20 kilovolts used for the cathode ray tube, since a variation in the high voltage produces a variation in the beam position on the screen. A spike of a few percent of the total voltage occurring in the high voltage supply can produce a detectable change in the beam position on the tube resulting in jitter.

A still further power supply problem is encountered in data display terminals when a video amplifier is used, for example, to pick up signals from a character generating monoscope for display on a cathode ray tube. Since the output of the monoscope is on the order of microwatts, variations in power supply voltage to the video amplifier are amplified along with the lower level signal input and are fed to the cathode ray tube as intensity modulation resulting in objectionable bright spots or blank spots on the screen.

Another problem in the circuit of many display devices has been the deflection circuitry, which must be synchronized with some incoming signal, thereby requiring a synchronizing system to be devised which preferably will operate on low level input synchronizing signals. Even small perturbations from the power supply will vary the phase of the deflection system at which the synchronizing pulse initiates the sweep so that for successive display rasters the sweep will start at slightly different points producing jitter.

Previous solutions to this problem have been to use either expensive filtering for the power supply or expensive additional amplification where possible for the incoming synchronizing signals. In many cases, however, it has not been feasible to provide high level synchronizing signals because of cost and because amplification of these synchronizing signals also amplifies other undesirable signals.

Additionally, when power supplies must be marketed throughout the world, they are subject to varying line frequencies of, for example, 40, 60, 100 Hertz or other frequencies so that if conventional transformers are used which are designed for one frequency they do not produce the correct voltage at any other frequency and would in fact burn up or produce an insufficient voltage for the system to operate at all. In those countries or in those applications where the power line frequency varies by 10% or 20% and/or where the power line voltage varies substantially, similar difficulties occur.

An additional problem of the prior art which is unique to digital data display systems is interference by power supply transients with the displayed data. When characters are digitally generated from stored logic for display, a certain number of bits of information are needed for each character. If, for example, six stored bits is sufficient to address a particular character for display, and one bit time is used as a spacing between characters, a total of seven bit times is required for the display of a character. If 50 characters are to be displayed on one line of a raster, 350 bit times are needed, not counting horizontal or vertical retrace time.

In switching mode power supplies of the prior art, the switching occurred at the line frequency or slower, which caused inductive transients or spikes which, when they occur simultaneously with the character display, cause degradation and even loss of the character. In the present invention, the power supply frequency is synchronized with the display logic, so that power switching occurs only during some of the 50 permissible bit times of a line which are the intercharacter times, and not during the 300 bit times used for character generation. Thus, any spike produced occurs during intercharacter time when the cathode ray tube is blanked, which eliminates interference with the display since switching never occurs during display time.

This invention provides for a system for generating any desired voltage or plurality of voltages from a wide range of input voltages and frequencies while at the same time eliminating undesirable interference of the power supply with the display system. This is accomplished by using a frequency in the power supply which is substantially higher than the line sweep frequency and is synchronized therewith so that it is a harmonic of the sweep frequency. This power supply frequency which may, for example, be generated by conventional oscillators, inverters, or other generators may be driven by dc which is produced by simple rectification so that any range of input frequencies from dc up will operate the device. In addition, the system may include a pulse width modulated regulator to minimize variations in line voltage and the regulator pulses can be synchronized with the power supply frequency.

Thus, it is a primary object of this invention to provide a dc to ac converter power supply for use with a data display system in which the switching frequency of the power supply is synchronized with the display system so that transients produced as a result of the switching frequency of the power supply occur at times other than when characters are displayed on the cathode ray tube screen.

Another object of this invention is to provide a high frequency switched power supply in which the switching frequency is substantially greater than the frequency at which lines of characters are displayed on the cathode ray tube.

Another object of this invention is to provide a high frequency switched power supply in which the switching frequency lies approximately in the range between 1 and 100 kilohertz.

Another object of this invention is to provide an efficient and economic combination high voltage and low voltage high frequency switched power supply in which both high voltage and low voltage outputs are taken from the same power transformer.

Another object of this invention is to provide a switched power supply for use with a digital data display system in which characters are displayed in a raster of lines wherein power supply switching occurs during intercharacter times, thereby eliminating objectionable transients and jitter from the display.

Another object of this invention is the provision of a control oscillator synchronized from an external source to control the switching frequency of a DC to AC inverter in a regulated switched power supply for use with a data display system such that the inverter operates in synchronization with the intercharacter time of the display.

Another object of this invention is the provision of a cyclic overvoltage and overcurrent protective circuit which allows substantially instantaneous shutdown under fault conditions and safe recycling until the fault conditions are removed, at which time normal operation of the supply is automatically resumed.

BRIEF DESCRIPTION OF THE DRAWINGS

Other and further objects and advantages of the invention will become apparent in connection with the accompanying drawings wherein:

FIG. 3 illustrates a block diagram of a power supply embodying the invention;

DESCRIPTION OF THE PREFERRED EMBODIMENT

Figure 1:
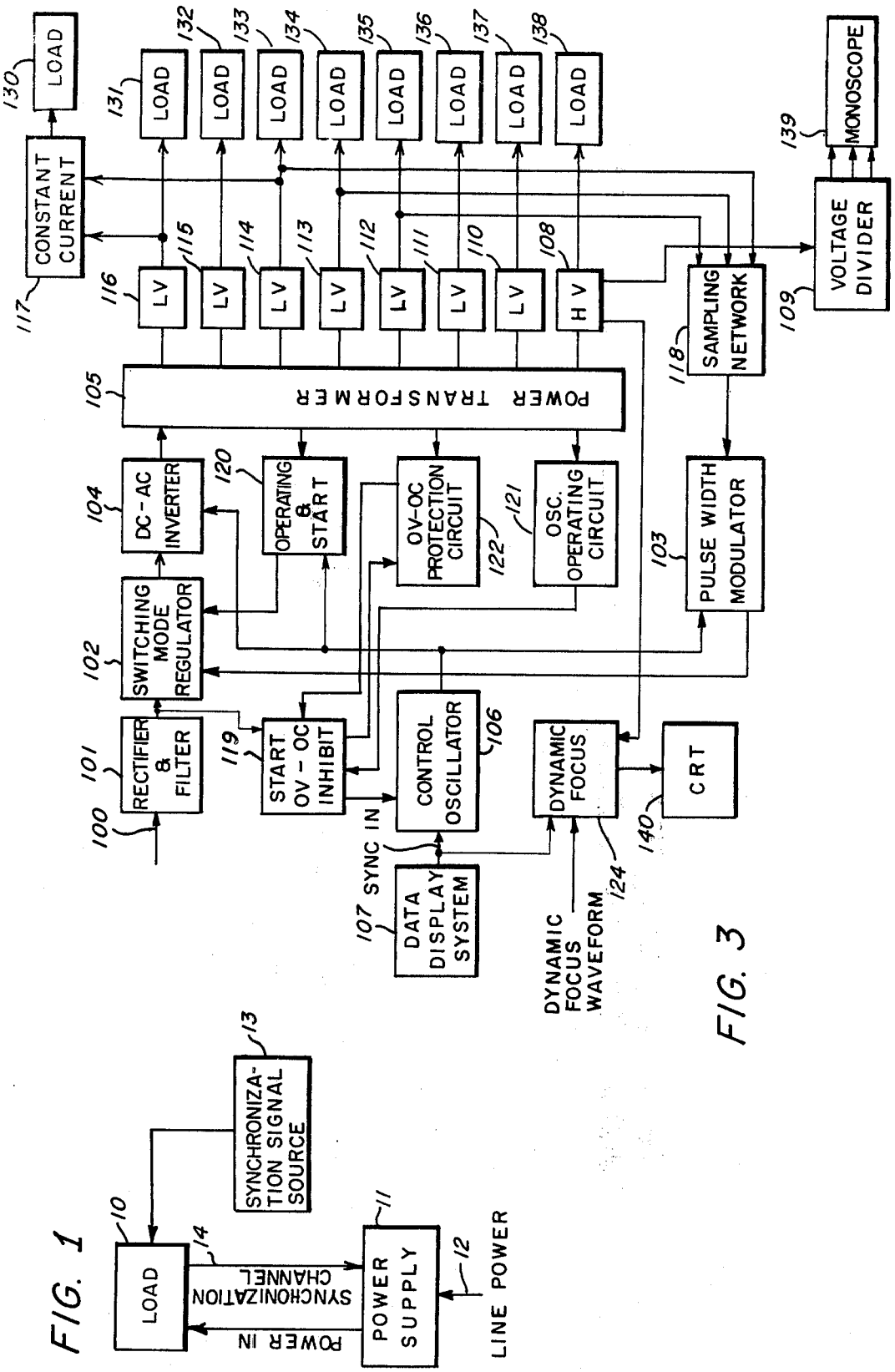
FIG. 1 illustrates a block diagram of the basic system embodying the invention.

Referring now to FIG. 1, there is shown a load 10 having a cyclical time varying characteristic such as a deflection circuit for a cathode ray tube, a clock for a computer shift register or any other desired time varying circuit. Substantially the entire power supply requirements of load 10 are fed from a power supply 11 which may be, for example, of the inverter type such as a switching mode power supply using silicon control rectifiers, an oscillator power supply operating Class A, B, C or D using tubes or transistors or a mechanical system such as a vibrator or motor-generator set. The frequency of power supply 11 is chosen to be substantially higher than the input frequency illustrated at 12 to the power supply 11. Preferably, the input supply 12 is dc which may be produced from any frequency by simple rectification and filtering. However, it should be clearly understood that the inverter power supply 11 may be designed to operate from any desired frequency.

The frequency of the power supply 11 is chosen high such that output filtering and regulation circuits as well as voltage transformer structures may be made smaller and hence less expensive while still retaining high reliability and efficiency. Some component of the power supply frequency, for example a fraction of a percent thereof, will appear as ripple in the output to the load 10, the remainder of the power going out at dc.

Load 10 has an input signal from a signal input source 13 which has a time varying characteristic such as a synchronizing signal with which load 10 is to be synchronized. This may be, for example, a computer subsystem such as a shift register driven by an external clock frequency, a data display system having a deflection circuit synchronized for repetitive display of input data, a radar system having a plan position indicator display system whose sweep is initiated in synchronism with the transmitted pulse or a television system in which the sweep system of the cathode ray tube is synchronized with the incoming signals.

Since the power supply 11 supplies many orders of magnitude more power to the load 10 than is present in the input signal from synchronization input 13, even a fraction of a percent of the power supply frequency which gets through the filtering in the power supply into the load 10 may be many times larger than the power of the input signal from the synchronization input 13. Accordingly, where such input signals are used to synchronize critical circuits in the load 10, such as the sweep circuits, any variations of the power supply with respect to the synchronization signal will pull the sweep initiation circuit such that sweep initiation will begin at alightly different times on successive sweeps, thereby producing a pronounced and objectionable jitter.

Additionally, where power supply variations occur after the sweep is initiated, character degradation will occur when the supply variation occurs in coincidence with the particular character being displayed.

In accordance with this invention, a synchronization channel is provided as shown by the connection 14 between the load 10 and the inverter power supply 11. In the illustration shown, a portion of the input signal with or without suitable amplification is fed back to the inverter power supply to synchronize the frequency of the supply with a multiple or harmonic of the sweep frequency. For example, if the inverter power supply frequency is 10 times the sweep frequency, every tenth cycle of the inverter power supply is synchronized with the signal input to the load 10 and in between the synchronization signals the frequency determining components of the inverter power supply 11 will retain this frequency substantially stable for the remaining 9 cycles so that the synchronization signal will on successive 10 cycle sequences occur at the same phase with respect to the inverter power supply frequency. Accordingly, the power supply frequency component supplied to the load will occur at the same phase with respect to the signal initiating the start of the sweep circuit, and during multiples of the sweep signal which occur at times when the display is blanked. Of course, the synchronization signal may be fed directed from signal source 13 to the supply 11 if desired, rather than from load 10 back to the power supply.

Figure 2:
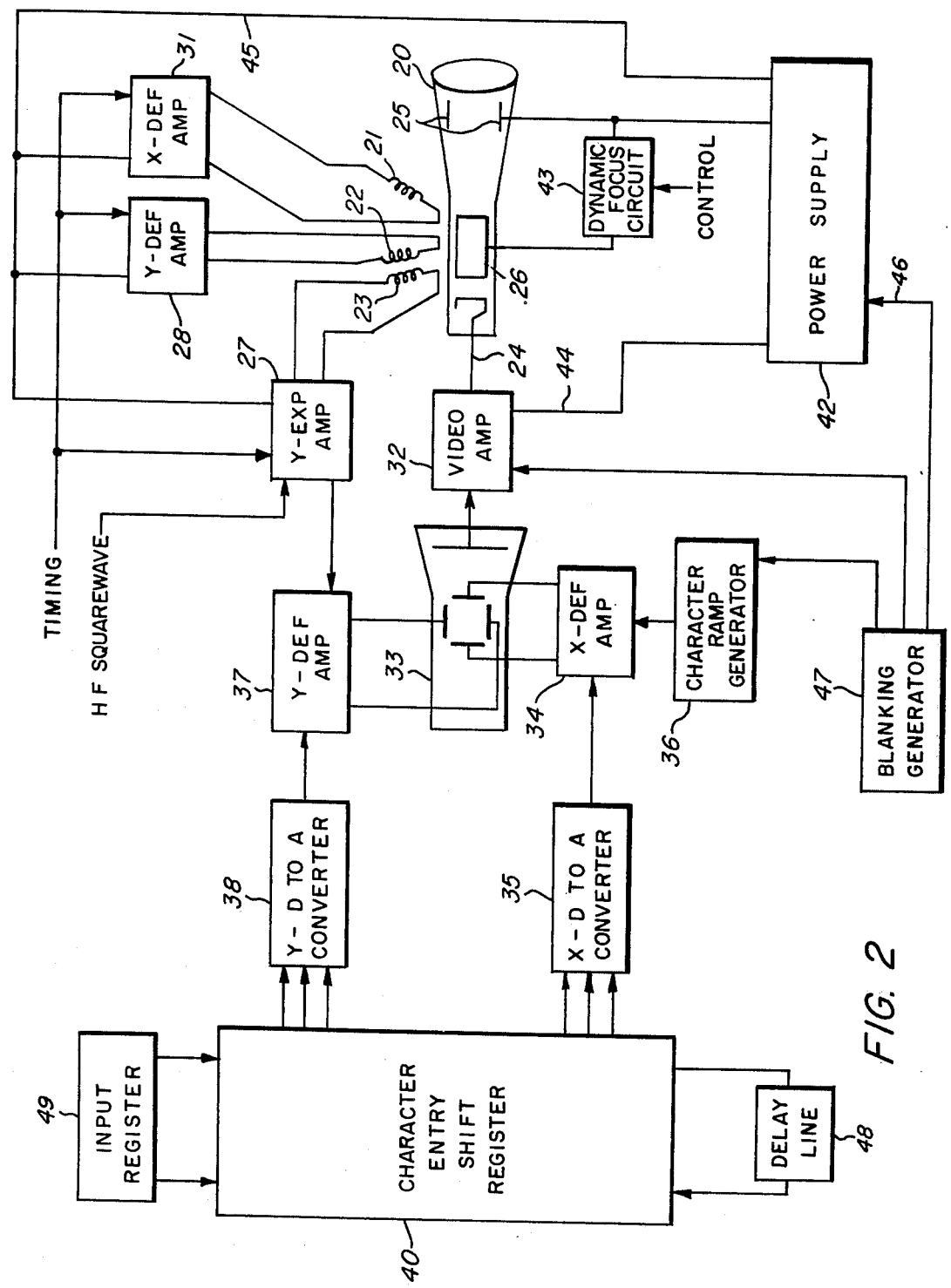
FIG. 2 illustrates a block diagram of a digital display terminal embodying the invention.

Referring now to FIG. 2, there is shown a block diagram of a data display system embodying the invention. As shown therein there is a cathode ray tube 20 having horizontal deflection coils 21, vertical deflection coils 22 and auxiliary coils 23, a cathode 24, a high voltage electrode 25, a focusing electrode 26 and additional control electrodes (not shown). Auxiliary coil 23 is fed from a Y expansion amplifier 27, vertical deflection coil 22 is fed from a Y deflection amplifier 28, and horizontal deflection coil 21 is fed from an X deflection amplifier 31. The cathode 24 is fed from a video amplifier 32 which is fed by the output of a monoscope 33. The X deflection plates of the monoscope 33 are fed by an X deflection amplifier 34 which is fed by an X D/A converter 35 and a character ramp generator 36. The Y deflection plates of the monoscope are fed by a Y deflection amplifier 37 which is fed by a Y D/A converter 38 and the Y expansion amplifier 27 which is driven by a high frequency square wave input. D/A converters 35 and 38 are fed from a character entry shift register 40 which is fed by a delay line 48 for dynamic storage purposes and by an input register 49 for supplying new information to the system.

The details of the above-described system for data display are more completely disclosed in the aforementioned co-pending application Ser. No. 19,190, filed Mar. 13, 1970, now U.S. Pat. No. 3,697,955 by Joseph E. Bryden.

In accordance with the present invention, an inverter power supply 42 has an output of high voltage, for example 15 KV, connected to the high voltage electrode 25 of the cathode ray tube. The 15 KV voltage is also fed through a dynamic focus circuit 43, which combines a portion of the horizontal drive with the vertical drive, to focus control electrode 26.

A voltage of any suitable magnitude, is also supplied from the inverter power supply 42 to the video amplifier 32 as shown at 44. Additional voltages are derived from the inverter power supply 42 for supply to all of the other components of the display system.

More specifically, the inverter power supply 42 comprises a transformer operating at between 1 and 100 kilohertz driven by an inverter circuit. Any desired high or low voltages needed by the display are obtained from the transformer by suitable windings on the secondary of the transformer corresponding to the desired voltage. The outputs of the secondary windings are then rectified and filtered to produce the required dc voltages.

A signal derived from the blanking generator 47 and in synchronism therewith which also is in synchronism with harmonics of the timing for the amplifiers 28 and 31 is applied to the inverter power supply as shown at 46. As illustrated herein, the input synchronization to the inverter power supply is designed to synchronize the inverter such that the switching characteristics of the inverter occur during blanking periods of the output from the monoscope 33 which is blanked during intercharacter time by a blanking pulse from blanking generator 47 being fed to the video amplifier 32 from generator 47.

In practice, in a system in which 45 characters are displayed in a line of the raster, the power supply inverter switches every second character during the time when the monoscope beam is being moved by the D/A converters to a different character for display and the blanking pulse of about two microseconds duration is being applied to the video amplifier 32.

The blanking pulses in a typical display system may occur at a frequency of about 100 kilohertz and switch type inverters with either silicon control rectifiers or standard power transistors may be switched every second intercharacter time during the blanking pulse input. Of course, switching may occur at other intercharacter times, such as every third or tenth intercharacter time.

Since the switching pulses occur at the same points in each line variations in the high voltage and sweep circuit synchronization is reduced to point where visually detectable jitter on the screen is eliminated. In addition, since the video amplifier is blanked off when such pulses occur, they are not fed to the cathode ray tube in amplified form, and accordingly undesired bright spots or blanks on the screen are eliminated.

Referring now to FIG. 3, there is illustrated a block diagram of a display system and power supply embodying the present invention. Input voltage is received at terminal 100 where rectification and filtering take place in rectifier circuitry 101. In accordance with a feature of the present invention, the input voltage need not be 60 cycle but may be, for example, dc, 40 cycle or 70 cycle, thus enabling the supply to be employed in countries which do not use standard 60 cycle power.

Once rectified, the input power is applied to a pulse width modulated switching mode regulator circuit 102 which is controlled by a pulse width modulator 103 to provide output current to a DC to AC inverter circuit 104 in accordance with sensed variations in selected output voltages, which sensed variations cause the pulse width of the control pulses, supplied to switching regulator 102 from pulse width modulator 103, to vary directly with respect to the sensed output voltage variations. Thus, when the output voltage decreases the pulse width decreases, and when the output voltage increases the pulse width increases. This pulse is then subtracted from the pulse produced by the operating and start circuit 120 which drives the switching mode regulator. Pulse width modulator 103 receives a squarewave input which is inductively coupled from the control oscillator to the pulse width modulator. The squarewave input is integrated to form a triangular waveform which is fed to a Schmidt trigger circuit, the dc triggering levels of which are established by sensing selected output voltages, to truncate the triangular waveform at levels corresponding to the sensed voltages, thereby producing the variable width pulses which control switching mode regulator 102.

DC to AC inverter circuit 104 receives the rectified and filtered pulse width modulated power output of switching regulator 102 and chops it into a squarewave which is applied to the main power transformer 105. Inverter circuit 104 is a two transistor push-pull switching circuit which will be more fully described with reference to FIG. 4. However, other inverter circuits of well-known design may be used. The switching frequency of inverter 104 is determined by a control oscillator 106 which includes an astable multivibrator. Synchronization pulses are applied to control oscillator 106 from a digital data display system 107 such that the multivibrator switching time is synchronous with the character display generated in accordance with a display system as described with reference to FIG. 2. In such a system, characters are displayed in a raster of lines, each character being generated from a stream of digital data in bit form in which a predetermined number of bits, for example six, is needed to address a particular character for display. The intercharacter time in a display system as described in FIG. 2 is one bit time; however, other intercharacter time periods can, of course, be used. The control oscillator 106 causes DC to AC inverter 104 to switch during this intercharacter time, thereby causing any undesirable spikes which may be generated to appear during this intercharacter bit time, thus avoiding the occurrence of jitter and other interference resulting from these spikes appearing during the time periods when characters are displayed on the cathode ray tube screen.

The switching frequency derived from the synchronization pulses is typically about 25 kilohertz. However, other frequencies somewhat above and below this frequency may, of course, be used. An advantage of switching at this high a frequency lies in the fact that the magnetics and filtering capacitors of the power supply may be greatly reduced in size since the iron necessary in the power transformer and in other transformers in the supply is much less due to the decreased inductance necessary at this switching frequency. An additional advantage lies in the fact that this frequency is above the audible, thereby eliminating objectionable audible noise.

Figure 6:
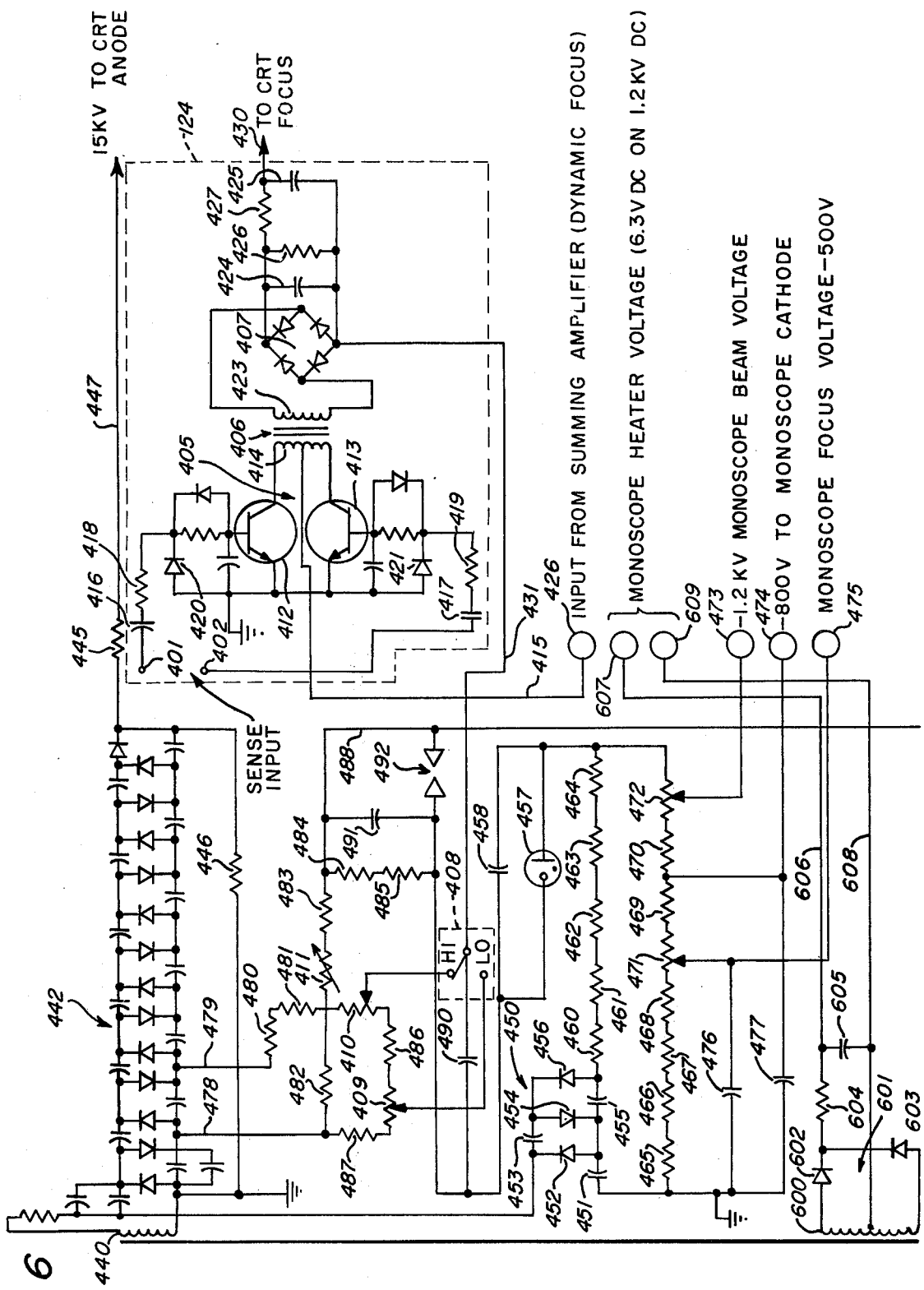

In accordance with a further feature of the present invention, all of the voltages for a data display system, both high voltages and low voltages, are derived from the same power transformer. Thus, the present power supply is a combination high voltage and low voltage power supply. High voltage circuits 108, 109 and 110, which will be more fully described with reference to FIG. 6, are derived from a high voltage winding on transformer 105 and produce the cathode ray tube anode voltage, the cathode ray tube accelerating potential, the dynamic focus voltage, and the monoscope focus and accelerating voltages.

Figure 7:
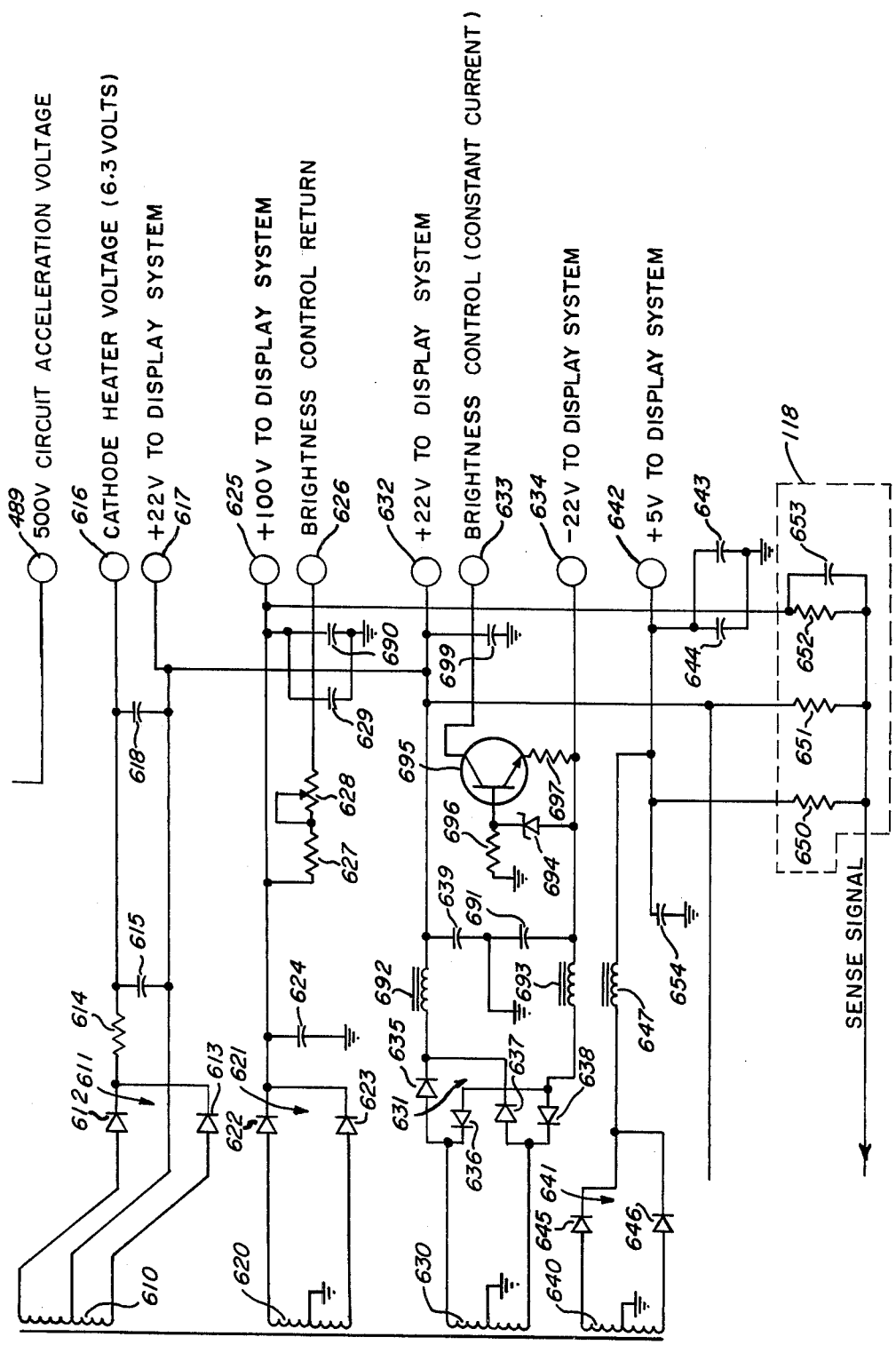

Low voltage circuits 111, 112, 113, 114, 115 and 116, which will be more fully described with reference to FIG. 7, are fed from low voltage windings on power transformer 105 and provide all of the low voltages necessary in the data display system to be used with the present invention, which is this case are +5, +22, −22, +6 and +100 volts, all referenced to chassis ground. A constant current circuit 117 fed from low voltage circuits 114 and 116 is used to provide brightness control to the cathode ray tube. A sampling network 118 is used to sense output voltage variations in selected low voltage outputs, and provides weighted current average of the sensed loads, in this case 100 volt circuit 114, 5 volt circuit 113 and 22 volt circuit 112, which sensed voltage variations are supplied to pulse width modulator 103 to provide pulse width modulation for switching regulator 102 as previously described. All of the outputs from the various high and low voltage output circuits are illustratively shown as connected to loads 130 through 140.

Starting circuits 119 and 120 initiate operation of control oscillator 106 and switching regulator 102, respectively. Starting circuit 119 supplies a prestart voltage from the output of rectifier and filter circuit 101 to the multivibrator circuitry of control oscillator 106. Starting circuit 119 also inhibits the operation of control oscillator 106 whenever overvoltage and/or overcurrent conditions exist at any of the output circuits of the supply. Short circuit or overvoltage or overcurrent conditions are reflected back across transformer 105 to overvoltage and overcurrent protective circuit 122 which operates to cause the Starting circuit 119 to short circuit the power input to control oscillator 106. Starting circuit 119 provides a current level to a recycle circuit in 122 in response to the signal applied from 122 to 119, the result of which is a repetitive initiation of operation of the control oscillator 106 and inhibiting of 106 cyclically. Thus the power supply cycles on and off with the permissible voltage to starting circuit 119 varying between two levels for as long as short circuit conditions exist across any of the loads.

Once the short circuit conditions are removed, current from protecting circuit 122 is no longer applied to starting circuit 119; hence, no short circuit is applied from 119 to 106, the oscillator again oscillates, the supply is turned on, and DC to AC inverter 104 receives the oscillations from the control oscillator 106 to produce the regulated squarewave applied to power transformer 105.

The solid state circuitry employed in protective circuit 122, starting circuits 119 and 120, and oscillator operating circuit 121 has a response time of approximately 1 microsecond, which is fast with respect to the total system, including the power transformer. These circuits under overload conditions never receive sufficient voltage to turn on completely before the supply again cycles off, thereby protecting the supply against the potentially damaging reflected short circuit.

The regulator starting and operating circuit 120 is driven by the output of control oscillator 106 and by a winding on transformer 105 such that when starting circuit 119 initiates operation of oscillator 106, oscillator 106 initiates operation of the regulator starting circuit to turn on regulator 102 substantially simultaneously with the initiation of operation of oscillator 106.

Referring now to FIGS. 4, 5, 6 and 7, there is shown a schematic of a power supply having provision for synchronization with the load such as a digital data display device. A source of voltage of, for example, either 60 cycle 115 volts or 230 volts is applied to the line rectifier and filter network 101, the input to which is indicated generally at 200 where in accordance with well-known practice a ground 201 is provided for the third terminal of the plug. A floating ground 202 is connected through a jumper 203 for switching from 115 to 230 volts. Inductors 204, 205 and 206 with capacitors 207 prevent RF interference from entering or leaving the display on the ac power line. When the unit is to be used with a 230 volt ac input, rectifiers 208, 209, 210 and 211 operate as a full wave bridge rectifier. Each half cycle of the input signal charges capacitors 212 and 213. When the unit is to be used with 115 volt ac input, with the jumper 203 in the position shown in FIG. 4, rectifiers 209 and 211 are removed from the circuit, and rectifiers 208 and 210 operate as a half wave voltage doubler. Thus, the same voltage is developed across capacitors 212 and 213 as with a 230 volt input.

Relay coil 214, which closes contact 220, and resistor 215 are connected through jumper 203 to a bus 216 which acts as a floating ground for the system. The B+ side of the line is fed through a terminal 217 of an ON-OFF switch 199 which may include interlocks and other suitable safety control features. A time delay relay 219 which comprises switch 220 and power resistor 221 may be introduced to guard against excessive current surges. When the time delay relay is actuated, resistor 221 is short circuited and input current flows through resistor 222 to the rectifier circuitry. Resistors 223, 224 and 225 provide dc leakage paths across capacitors 207 and 212, respectively. Power dissipation resistor 226 reduces current peaks through rectifiers 208 through 211 in the bridge rectifier configuration used for 230 volts input when the jumper 203 is connected to resistor 226. Capacitor 227 is used to filter line ripple before the input is fed through a fuse 228 to the regulator circuitry.

The switching regulator circuit 102 will now be described. Regulator 102 converts the rectified DC voltage to a closely regulated power source. The control provided by the switching regulator sets the overall operating level of the main power transformer 105 and thus establishes the average level of all power supply outputs.

Series regulator 229 is normally non-conductive and is driven on when the equipment is first turned on by a squarewave pulse supplied by winding 290 of the transformer 250 driven by the control oscillator 106. The squarewave is clamped to the output of regulator 229 by a diode 295 and a capacitor 291 and is fed through diode 292 and resistors 293 and 294 to the control electrode of the regulator 229. As a result, regulator 229 conducts for 50 percent of the time, producing sufficient current to charge the output filter circuit 235 through inductor 234 to supply power to inverter 104 to drive the transformer 105.

The winding 232 of transformer 105 produces a squarewave similar to that produced by transformer 250 and performs two functions. First, opposite ends of winding 232 are fed through rectifiers 300 and 301 to provide full wave rectification of the output of winding 232 which is filtered across capacitor 305 to produce an essentially dc power for the amplifier 230. Second, one end of winding 232, the center tap of which is connected to the output of regulator 229 is connected through a capacitor 302 and current limiting resistor 303 to a clamp diode 304 which performs a similar function to the clamp diode 295. The output from the junction between diode 304 and resistor 303 is connected through resistor 294 to the output of amplifier 230 which is also the control input of regulator 229. The amplitude of the pulse produced by the winding 232 is sufficiently larger than the amplitude produced by the winding 290 that it causes diode 292 to block so that winding 290 will be used only for starting purposes and may be made of an intermittent light duty design while winding 232 is designed for heavy duty or continuous operation. The negative output of rectifiers 300 and 301 is sufficient, in the absence of the squarewave pulse from winding 232, to maintain the regulator 229 cut off. However, when the positive excursion of the squarewave pulse appears the regulator 229 will conduct. The input to amplifier 230 is supplied by a variable width pulse by winding 320 from transformer 231 driven by the pulse width modulator 103. This pulse is clamped by a diode 322 and capacitor 323 and is also a positive going pulse of variable width whose leading edge trails the leading edge of the pulse generated by winding 232.

When the pulse from winding 320 arrives at the input of amplifier 230 through a voltage divider network comprising resistors 324 and 325, it drives amplifier 230 strongly conductive, producing a sufficiently large drop across resistor 294 to override the pulse produced by winding 232 and reduce the potential at the control electrode of regulator 229 below the cutoff for the regulator, thereby rendering regulator 229 non-conductive. The extent to which the control electrode of regulator 229 may be driven negative with respect to its output is controlled by a voltage regulating diode 312, positive excursions of said electrode being unaffected by regulating diode 312 since it is blocked under these conditions at diode 313. The manner in which the duration and timing of the pulse input to winding 320 is generated will be described subsequently.

The DC to AC inverter 104 consists of two transistors 239 and 240 arranged in push-pull as a chopper to convert the regulated and rectified dc input into a squarewave at the synchronization frequency of about 26 kilohertz which is applied to the main power transformer 105. As illustrated, the emitters of inverter transistors 239 and 240 are connected to the center tap 241 of inverter driving winding 249 on transformer 250. Free wheeling diode 243 provides for a flow of current through inducter 234 when the regulator 229 is shut off. Base drive is applied to the bases of 239 and 240 by the opposite ends of the driver windings of transformer 250 through self-biasing networks 243 and 244 comprising resistors 245 and 247 and capacitors 246 and 248. The inverter circuit is completed with the connection of the collectors to the opposite ends of winding 238, of the main power transformer 105 through which the inverter output is inductively coupled to transformer 105. Secondary winding 249 drives transistors 239 and 240 sufficiently to generate the squarewave voltage output and at the same time produce sufficient current to provide suitable biasing for networks 243 and 244.

As described with reference to FIG. 3, the inverter frequency is controlled in accordance with an input synchronization signal developed in the display timing and coupled to the power supply by conventional logic circuitry such that the phase of the switching times of the squarewave occurs in the spaces between the characters to be displayed on the display device described in FIG. 2. The coupling device may be a conventional master slave flip flop TTL logic element such as the Ser. No. 7473 of Texas Instruments.

Figure 4:
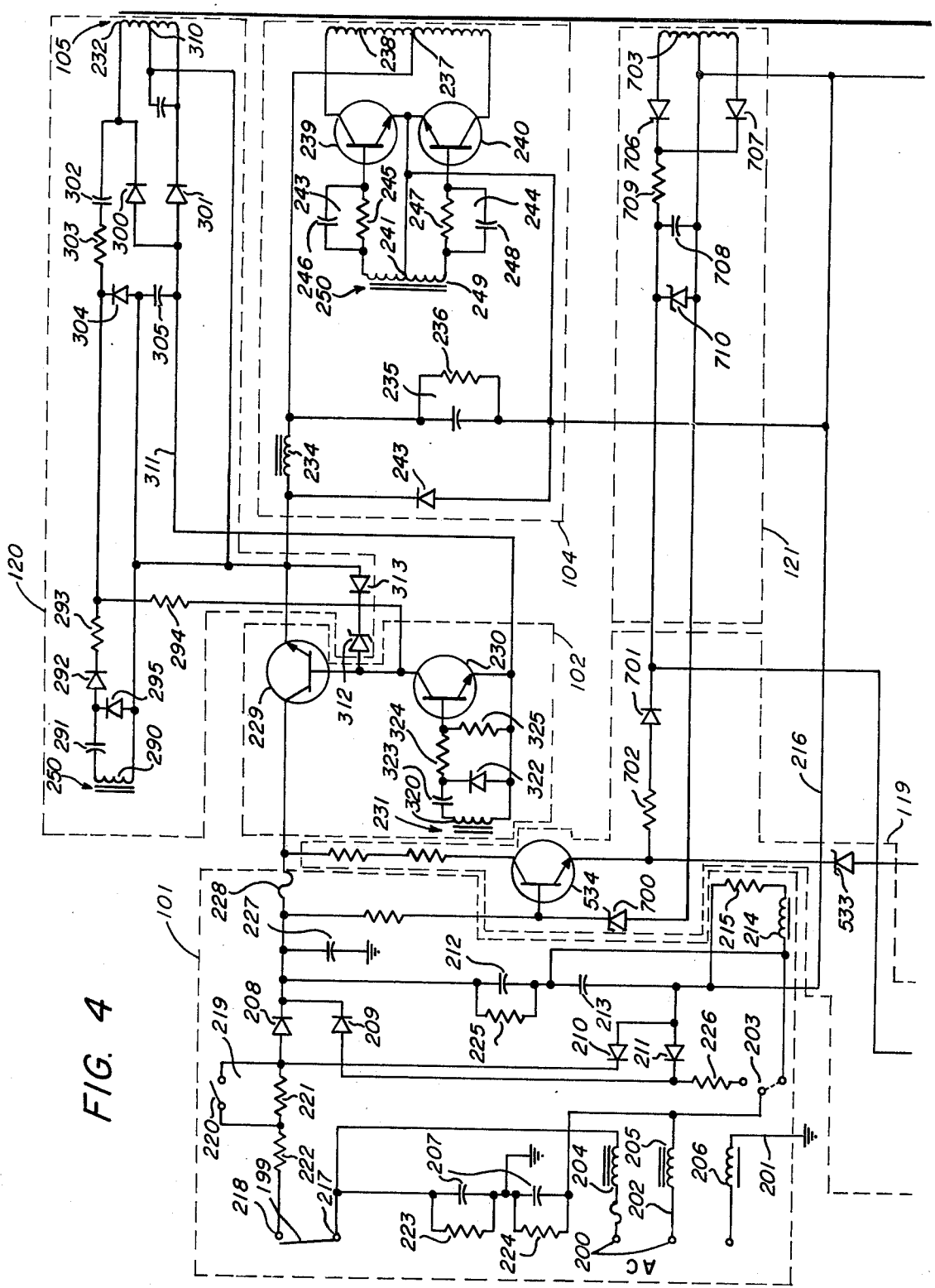
FIGS. 4, 5, 6 and 7 taken together illustrate a schematic diagram of the power supply of FIG. 3.
Figure 5:
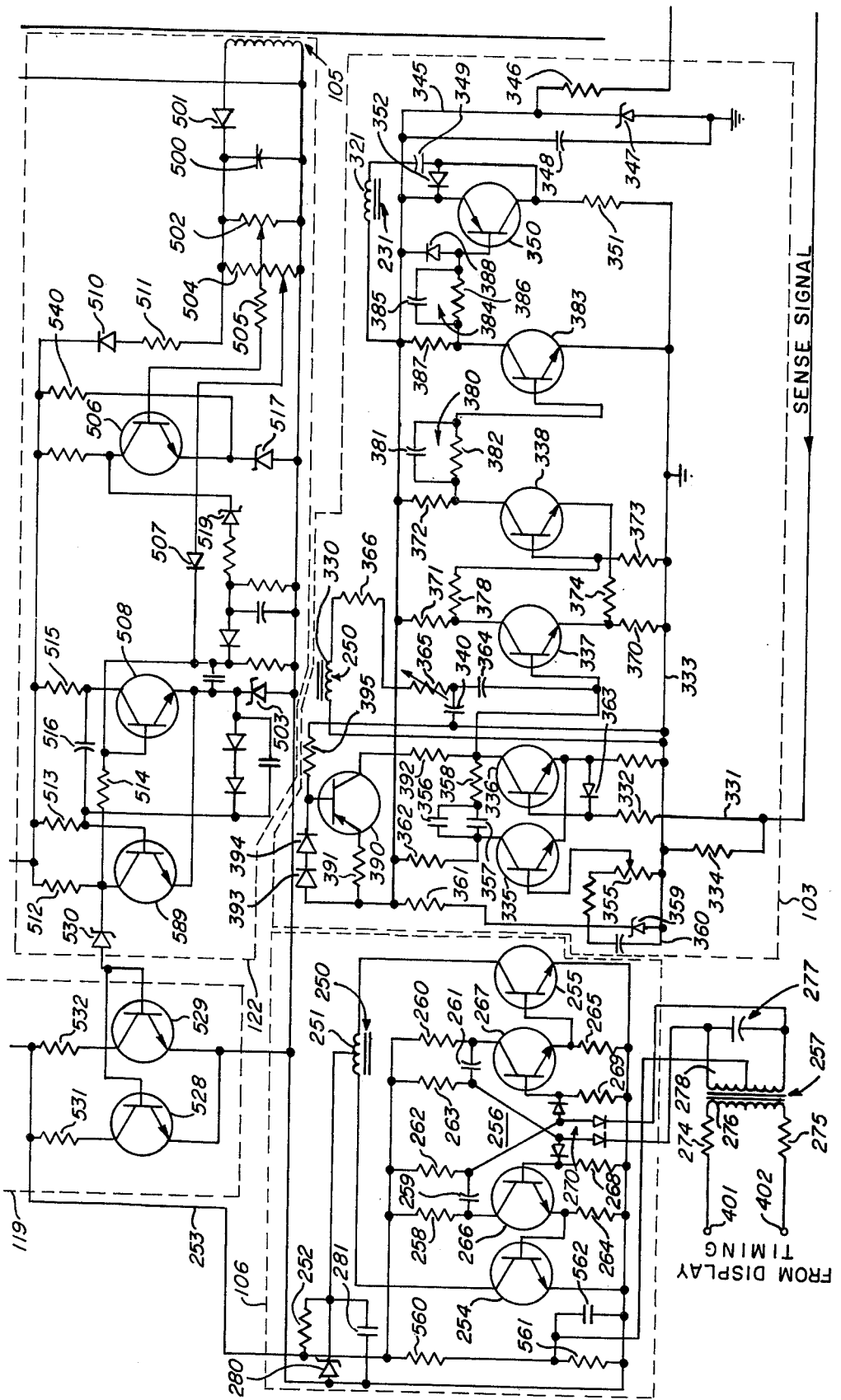

The above-mentioned synchronization is accomplished as shown in FIG. 5 by driving the primary side of transformer 250 to couple the squarewave output of control oscillator 106 to the inverter 104. The center tap 251 of transformer 250 is connected through resistor 252 to the B+ supply bus shown at 253 which is supplied from the oscillator operating circuit 121, the operation of which will be described with reference to FIG. 4. The opposite ends of winding 251 are connected respectively to the outputs of a pair of transistor amplifiers 254 and 255 which operate in push-pull to drive transformer winding 251 from the output of an astable multivibrator 256.

Multivibrator 256 comprising transistors 266 and 267 provides a 26 kilohertz drive for the power inverter, the 26 kilohertz signal being obtained from the display timing through resistors 274 and 275 to the primary winding 276 of transformer 257 to phase lock the multivibrator to the display timing. If the multivibrator were allowed to free run, signal harmonics generated from the power supply frequency and display timing signals might cause display fading or flickering. Locking the power supply frequency to an internal timing frequency prevents generation of unwanted harmonics. The frequency of operation of multivibrator 256 in the absence of an input synchronization signal would be fixed by resistors 258 and 260 and capacitors 259 and 261 and is slightly lower than the incoming synchronization signal frequency thereby locking and synchronizing the multivibrator frequency to the incoming synchronization signal. Resistors 262 through 265 are biasing resistors to provide suitable voltages and currents to transistors 266 and 267, the bases of which transistors are grounded through resistors 268 and 269.

For the circuit described, multivibrator 256 is synchronized at a frequency of 26 kilohertz, but any desired frequency from 1 to 100 kilohertz may be used. In practice, the input signal pulse applied to winding 276 of transformer 257 appears equally but in opposite polarity at the ends of the output winding 278, whose center tap is connected to a positive voltage at the junction of resistors 560 and 561, as positive and negative going excursions, but only the negative excursions can trigger that one of the transistors 266 and 267 which is non-conductive. Capacitor 277 is positioned around winding 278 to accentuate the synchronizing frequency input applied to multivibrator 256 through a network 270. A zener diode 280 maintains a constant voltage across coupling capacitor 281 and in conjunction with resistor 252 sets the voltage level on the primary winding 251 of transformer 250.

The starting circuit 120 for regulator 102 as previously described is also fed from transformer 250.

The secondary winding 320 of transformer 231 as previously described supplies a variable width pulse to the input of amplifier 230. The primary winding 321 of transformer 231 is the output of pulse width modulator circuit 103.

The squarewave output of transformer 250 is applied to a secondary winding 330 to supply a squarewave pulse to the pulse width modulator circuit 103 from the control oscillator 106.

A sense signal is applied from sampling network 118 along line 331 through resistor 332 to a differential amplifier in the pulse width modulator circuitry as will be described. Line 331 is connected to chassis ground 333 through sense signal load resistor 334. The differential amplifier comprising transistor 335 and 336 generates an error voltage from the sensed output currents. This error voltage sets the trigger level of a Schmidt trigger formed by transistors 337 and 338 which is fed the squarewave input from winding 330 of transformer 250 after integration by capacitor 340 and resistors 365 and 366 which results in a triangular waveform which when cut off at a varying height due to the varying trigger level produces the variable width pulse output coupled through transformer 231 to transistor amplifier 230.

One end of the primary winding 321 of transformer 231 is connected to a B+ bus 345 derived from the output of the power supply through a resistor 346 and maintained at a constant potential by a voltage regulator reference diode 347 and filter capacitor 348. The other end of winding 321 is connected through a coupling capacitor 349 to the collector of a transistor amplifier stage 350 whose emitter is connected directly to the B+ bus 345 and the collector of which is grounded through load resistor 351. A protective diode 352 is connected between the emitter and collector of transistor 350. The sensed reference voltage on line 331 which is applied through resistor 332 to the base of transistor 336, which is part of the differential amplifier comprising transistors 335 and 336, develops the triggering level for the Schmidt trigger as previously described. An adjustable bias reference voltage is also applied through potentiometer 355 to the base of transistor 335.

A network comprising capacitors 356 and 357 stabilizes the input through resistor 358 to the collector of transistor 336. Zener diode 359 and filtering capacitor 360 provide a reference voltage through resistors 361 and 362 for the base of transistor 335. Diode 363 protects transistor 336 against excessive emitter base voltages. Coupling capacitor 364 feeds the triangular waveform generated across integrating capacitor 340 to the base of transistor 337, and potentiometer 365 is used to adjust the time constant of integrating circuit including capacitor 340 potentiometer 365 and resistor 366. When the applied dc voltage on the base of transistor 337 is zero, then that transistor is OFF and transistor 338 is ON. The voltage across resistor 370 is greater than zero. When the voltage applied to the base of transistor 337 rises to approximately the voltage drop across resistor 370, transistor 337 begins to conduct lowering the voltage on the collector and raising the emitter voltage across resistor 370. These excursions will reduce the base current in transistor 338 to the point that transistor 338 comes out of saturation. The decrease in the collector voltage on the collector of transistor 338 causes the voltage drop across resistor 370 to fall which increases the base current of transistor 337. Both transistors are active and the circuit is regenerative. The regeneration continues until transistor 337 is ON and transistor 338 is OFF. The collectors of transistors 337 and 338 are tied to line 345 through loaresistors 371 and 372 respectively. Paths to ground are provided for the base and emitter of transistor 338 through resistor 373 and the combination of resistors 374 and 370, respectively. A dc coupling path is provided between the collector of transistor 337 and the base of transistor 338 through resistor 378.

A coupling 380 which comprises capacitor 381 and resistor 382 couples the pulse width modulated Schmidt trigger output to the base of a transistor amplifier 383 which along with transistor 350 provides two stages of amplification for the generated pulse. Coupling network 384 comprising capacitor 385 and resistor 386 couples the output of amplifier 383 to the base of amplifier 350 where it is coupled through across capacitor 349 to transformer winding 321 of transformer 231 to provide the variable base drive on transistor 230. Resistor 387 is a collector load resistor for transistor 383 while diodes 388 and 352 protect the emitter and collector junctions of amplifier 350 respectively. The pulse width of the amplified squarewave produced by the pulse modulated circuitry is directly proportional to the sensed voltage amplified and applied to the Schmidt trigger.

Transistor 390 is a constant current generator to maintain a constant current on the base of transistor 337 through a path provided by resistor 392 thereby establishing along with the output of the differential amplifier the trigger levels at which the Schmidt trigger will fire and hence establishing the pulse width of the output squarewave therefrom. As the value of the sensed signal increases, the leading edge of the output waveform advances in phase to a point closer to the leading edge of the squarewave output from transformer 250. The Schmidt trigger output waveform is amplified and applied to amplifier 230 in the regulator 102. Advancing the phase of this waveform decreases the pulse width of the drive to regulator 229. Diodes 393 and 394 maintain the base of transistor 390 positive with respect to the emitter and resistor 395 provides a path from base to the chassis ground 333.

The overvoltage and overcurrent protective circuitry will now be described with reference to FIG. 5. The dc voltage supply for the synchronous multivibrator 256 of control oscillator 106 is controlled by a transistor switch comprising transistors 528 and 529 in the overvoltage overcurrent protection circuit. A rectified sample of the average ac voltage in the main power transformer 105 is monitored by a voltage comparator amplifier. If the voltage sample exceeds adjustable upper or lower limits, the transistor switch is turned on and the supply voltage to the synchronous multivibrator is short circuited to the main dc return, at which time the synchronous multivibrator stops operation, removing drive from the high power inverter thereby disabling all dc voltages obtained from the main transformer. If the shutdown resulted from overvoltage, the voltage comparator operates as soon as the voltage falls to an acceptable level, the voltage supply is reapplied to the synchronous multivibrator and operation resumes. The dc voltage obtained from the main dc line through starting transistor 534 permits the comparator to operate even during shutdown. Potentiometer 504 sets the overvoltage shutdown threshold.

If the shutdown resulted from an overcurrent (undervoltage), operation will not resume automatically as the ac power must be turned off then on again. Slow time constants in the comparator prevent another shutdown until the dc voltages have come up to their normal levels and if the voltage levels are still low at that time, another undervoltage shutdown occurs with potentiometer 502 setting the undervoltage shutdown threshold.

If for any reason the regulator circuitry described with respect to FIG. 4 were to malfunction or not regulate, a large ac voltage would be applied to the main power transformer creating a destructive overvoltage on the loads being fed from the supply. Thus, the overvoltage protective circuit is designed to shut down the power supply when such overvoltage condition exists thereby safeguarding any external circuitry fed by the supply.

Overcurrent conditions would exist in the event that a short circuit were to appear on any of the power supply loads, which short circuit could burn out any power supply components not rated for the amount of current which would be reflected back across the power transformer. Thus, the overcurrent protective circuitry to be described protects the power supply from overcurrent conditions caused by short circuited outputs. When either an overcurrent or overvoltage condition exists, a changed voltage appears across capacitor 500. Diode 501 rectifies the squarewave voltage from power transformer 105 and after filtering by capacitor 500. The overcurrent condition is sensed by potentiometer 502 which senses a decreased voltage level, which is then applied through current limiting resistor 505 to the base of transistor 506.

The overvoltage condition is sensed by potentiometer 504 to produce an increased voltage, which is fed through blocking diode 507 which when the voltage increases to a level greater than the bias applied to the base of normally nonconducting transistor 508 which along with transistor 509 forms a monostable multivibrator which, on overload, cycles at approximately one hertz. Diode 510 normally conducts to supply the voltage across capacitor 500 as the B+voltage for amplifier 506. Resistors 512, 513, 514 and 515 and capacitor 516 supply the various voltages and currents necessary for the operation of the monostable multivibrator.

Zener diode 503 maintains a constant voltage on the emitter of transistor 508 and 589. Zener diode 517 maintains a constant voltage level on the emitter of transistor 506 by reason of current drawn through bleeder bias resistor 540. The tap on potentiometer 502 is set so that transistor 506 is conducting during normal operation. An overcurrent condition produces a drop across capacitor 500 dropping the voltage on the base of transistor 506 thereby increasing the voltage on the collector of transistor 506. This increased voltage is fed through zener diode 519 to trigger the monostable multivibrator.

When the monostable multivibrator is triggered, a voltage sufficient to produce conduction of zener diode 530 is cyclically produced which turns on a switch comprising transistors 528 and 529 with associated collector current limiting resistors 531 and 532 to create a low resistance path to provide an effective short circuit across the power supply for the control oscillator.

The starting transistor 534 is conductive during start since no voltage is yet produced by winding 703 of transformer 105 and the base of transistor 534 is maintained at the voltage of zener diode 700 to render transistor 534 strongly conductive. During normal operation, the voltage generated by winding 703 of transformer 105 is rectified by diodes 706 and 707 and filtered by capacitor 708 and resistor 709 to produce an operating voltage determined by zener diode 710, which is greater than the voltage on the base of transistor 534 so that transistor 534 is cut off and all of the power for the multivibrator 256 is supplied from winding 703.

When an overcurrent triggers the monostable multivibrator to reduce the voltage on bus 253, any voltage being developed by winding 703 is dropped across resistor 709 and diode 701 conducts causing current to flow through resistor 702 causing transistor 534 to conduct and to maintain power to the monostable multivibrator through zener diode 533. When the monostable multivibrator which has a cycle time of approximately one second reverts to its normal condition, the low resistance path is removed from bus 253, permitting the multivibrator 256 to restart operation with transistor 534 conducting as in a normal start.

Since a finite amount of time of close to one second is required for all the starting circuits to fully activate, damaging transients cannot occur during the one hertz recycle time of the fault protection circuit since the supply is never actually started during fault time, as the cycling off occurs before sufficient starting current and voltages are present for normal operation.

When an overvoltage condition exists, transistor 534 is not turned on because the base voltage supplied by zener diode 700 is less than the voltage supplied by zener diode 710 which is derived from the voltage on center tapped winding 703 on power transformer 105, rectified by a full wave rectifier comprising diodes 706 and 707, filtered by capacitor 708, and passed through voltage dropping resistor 709.

Referring now to FIG. 6, there is shown the details of a dynamic focus circuit in which a signal input is derived from terminal points 401 and 402 of a synchronizing signal input circuit feeding the primary of transformer 257 in FIG. 5 from an output winding of a synchronization signal output transformer indicated at 400 which would normally be located in the load circuit.

Isolating resistors 274 and 275 are interposed between winding 300 and the input to transformer 257 to reduce any undesired interference between other loads fed by the synchronizing signals and the multivibrator circuit 256.

Operationally, the dynamic focus modulator circuit compensates for the different cathode ray tube focus voltages required at the center vis-a-vis the sides of the cathode ray tube screen. The compensation is achieved by superimposing parabolic voltages, which are obtained from a dynamic focus function generator to be described, on the high voltage focusing potential.

The modulator circuit consists of a 26 kilohertz push-pull amplifier 405 transformer coupled by transformer 406 to a full wave bridge rectifier 407. The dc power for the amplifier is obtained from the dynamic focus function generator. Thus, the 26 kilohertz signal induced across the primary of transformer 406 is proportional to the parabolic focus correction signals from the function generator. At the secondary of transformer 406, the parabolic envelope is detected by the bridge rectifier 407 and superimposed upon the focusing potential of about 5 kilovolts obtained from the high-low switch 408 to be described.

The dynamic focusing function generator input is obtained by summing the parabolic voltages produced by the horizontal and vertical deflection coils. Potentiometers 409 and 410 provide different adjustable voltages by way of HI-LO switch 408 so that the equipment will work with cathode ray tubes having substantially different focusing voltages. The input 426 from a parabolic voltage summing amplifier is applied to transistor 412 which along with transistor 413 forms the push-pull amplifier 405 previously mentioned.

As shown in FIG. 5, terminal points 401 and 402 are connected respectively to the bases of a pair of amplifying transistors 412 and 413 operating in push-pull. The emitters of transistors 412 and 413 are grounded while the collectors are connected respectively to the opposite ends of a winding 414 on transformer 406. The center tap of winding 414 is connected to the dynamic focus function generator input voltage, via line 415, which consists of parabolic waveforms derived from the horizontal and vertical deflection circuits such that the voltage supplied to the collectors varies parabolically from a predetermined value at the beginning of the deflection to a final value at the end of the deflection and the focus remains essentially constant as the beam is deflected across the face of the screen.

The synchronizing signal inputs from points 401 and 402 are passed through capacitors 416 and 417, respectively, and resistors 418 and 419, respectively, to networks 420 and 421, respectively, which act as clamp circuits to prevent negative excursions of the input signals from being applied to the base of transistors 412 and 413 while permitting positive excursion of these signals to be so applied and, in addition, to provide the means for biasing the transistors to the correct operating level.

The positive excursions of the transistors which are applied in push-pull are amplified as a function of the voltage applied to the center tap of the winding 414 and appear in the output winding 423 of the transformer 406 where they are rectified by the full-wave bridge rectifier 407, filtered by ripple capacitor 424 and 425, and resistor 427, and bypassed by resistor 315 to produce an output of substantially dc voltage varying as a function of the input voltage from the dynamic function generator input at 426.

The dynamic focus voltage is applied to the electrostatic focus electrode of the cathode ray tube display device from terminal 430 and is added to the voltage produced along bus 431 from the HI-LO switch 408 which is derived either from potentiometer 409 or 410 in the high voltage circuit to produce a dc component of the focus voltage, depending upon the choice of cathode ray tube desired.

As a result, the focus voltage is made to vary as a function of the position of the electron beam on the face of the CRT so that the beam remains sharp and focused.

The use of the transformer 406 and push-pull amplifier 405 allows low voltage signals to be used for the varying part of the dynamic focus waveform while these signals are isolated from the high voltage component derived from the high voltage supply.

As previously described, the power supply of the present invention is both a high voltage and a low voltage power supply providing all of the requisite voltages ranging from 15 KV to −22 volts for a data display system. However, it is to be understood that other voltages within this range and above and below these values may be provided. High voltages of 15 KV, −1.2 KV and 500 volts are provided by the high voltage circuitry of the present invention.

A high voltage winding 440 on the secondary of the main power transformer 105 develops approximately 1000 volts, which voltage is applied through a fusable resistor 441 to a series of fourteen stages of diode-capacitor voltages doubler rectifier stages of well-known design indicated generally at 442 to develop approximately 15 kilovolts which is fed through resistor 445 to the cathode ray tube anode voltage Line 447.

Transformer winding 440 supplies another three-stage diodecapacitor voltage doubling and rectifying network indicated generally at 450 comprising capacitors 451, 453 and 455, and diodes 452, 454 and 456. The rectifier output is regulated by a type 6V5 gas discharge tube indicated at 457 and ripple filter capacitor 458, and the output feeds a voltage divider circuit comprising resistors 460 through 470 and potentiometers 471 and 472 to provide the focus and accelerating voltages for the monoscope. In the present embodiment, the tap on potentiometer 472 provides the monoscope beam voltage of −1.2 kilovolts indicated at 473. A tap between resistors 469 and 470 supplies a voltage of about −500 to the monoscope cathode indicated at 474. a tap on potentiometer 471 supplies the monoscope focus voltage of about −500 volts indicated at 475. The monoscope focus voltage output and the monoscope cathode voltage output are filtered by filter capacitors 476 and 477, respectively.

Part of the output of the voltage doubler network 442 is coupled through taps 478 and 479 to a voltage divider comprising resistors 480 through 487 and potentiometers 409 and 410 which supplies the HI-LO potentials to switch 408 for supply to the dynamic focus circuit along line 431 as previously described, and the +500 volt cathode ray tube accelerating potential along line 488 to the cathode ray tube accelerator grid indicated at 489. Capacitor 490 provides filtering for the focus voltage coupled through the HI-LO switch, and capacitor 491 acts as a filter for the cathode ray tube acceleration voltage output. A spark gap indicated generally at 492 provides circuit protection from excessive voltages that could result in the accelerator grid of the cathode ray tube in the event of malfunction which might damage voltage multiplier network 442.

Low voltages provided by the same power transformer from which the high voltages previously described are obtained are derived from windings 600, 610, 620, 630 and 640. These low voltage windings 600 through 640 drive five full wave rectifier circuits indicated at 601, 611, 621, 631 and 641, respectively. Rectifier circuit 601 comprises diodes 602 and 603, loading resistor 604 and filter capacitor 605. Rectifier circuit 611 comprises diodes 612 and 613, current limiting resistor 614 and filter capacitors 615 and 618. Rectifier circuit 621 comprises diodes 622 and 623. The filtered output of winding 600 is applied along line 606 to an output indicated at 607. Winding 600 is center tapped on line 608 to an output indicated at 609 with the outputs 607 and 609 providing the monoscope heater voltage which is 6.3 volts DC riding on −1.2 kilovolts DC.

Center tapped winding 610 provides two low voltage outputs lf 6.3 volts and +22 volts referenced to chassis ground to the cathode ray tube heater indicated at 616 and +22 volts to various display elements indicated at 617, respectively.

Center tapped winding 620 provides two additional output voltages, one of 100 volts filtered by capacitor 624 to various portions of the display system indicated at 625 and the other of which is of variable output voltage of between −15 and 85 volts at about 20 milliamps to the constant current brightness control return indicated at 626. A network comprising resistor 627 and potentiometer 628 allows this circuit to be adjusted. Capacitors 629 and 690 filter and isolate from ground the 100 volt output at 625.

Center tapped winding 630 provides a 22 volt output indicated at 632 to various circuits in the display requiring that voltage and a constant current output of approximately 20 milliamps to the brightness control circuitry indicated at 633 and which is returned as previously described at 626. A −22 volt output is also produced from this winding as indicated at 634 which is used by various elements of the display system. These voltages are derived through two full wave bridge rectifier circuits comprising diodes 635, 636, 637 and 638 to remove objectionable ripple. A zener diode 694 provides a reference voltage across the base of transistor 695. Since resistor 696 is grounded, the current provided to the base of transistor 695 is a constant which is amplified to provide the constant current output of 20 milliamps indicated at 633. Resistor 695 provides suitable emitter biasing for transistor 695 and the 22 volt output to the display system indicated at 632 is isolated from ground by capacitor 699.

Center tapped winding 640, in a manner like windings 600 through 630, provides the constant 5 volt output indicated at 642 which is supplied to the various logic circuitry in the display system supplied by the instant power supply and is filtered and isolated from ground by capacitors 643 and 644. A full wave rectifier comprising diodes 645 and 646 rectifies the voltage which is supplied through filter choke 647 to the 5 volt output indicated at 642. Sensing resistors 650, 651 and 652 sample the output voltages of 5, +22 and 100 volts, respectively, to provide the output sample current along line 331 as previously discussed with respect to FIG. 5. Capacitor 654 acts as a filter on the 5 volt sample output. Capacitor 653 improves feedback on the 100 volt sample output to reduce ripple in the output.

What is claimed is:
1. In combination:
    rectifier means for receiving line voltage;
    switching regulator means for converting said line voltage into a chopped dc voltage;
    first control means for synchronizing the output of said switching regulator with an external system;
    a power transformer for conversion of said controlled output of said switching regulator into a plurality of high voltage and low voltage outputs; and
    second control means including a pulse width modulator for sensing the outputs of said power transformer and modifying the pulse width of said switching regulator in accordance with with said sensed output, the switching frequency of said regulator being independent of an output of said transformer to permit the synchronization of said switching frequency with said external system.
2. A power supply comprising:
    a pulse width modulated switching regulator for regulating a dc input voltage in accordance with sensed variations in the power supply output;
    means for rectifying the output of said pulse width modulated switching regulator;
    DC to AC conversion means for converting said rectifier output to ac;
    a transformer for coupling said ac output to a load; and
    synchronization means for synchronizing the frequency of said DC to AC conversion means with the frequency of said switching regulator.

* * * * *

UNITED STATES PATENT OFFICE
CERTIFICATE OF CORRECTION

Patent No. 3,967,181          Dated June 29, 1976

Inventor(s) Derek Chambers et al.

It is certified that error appears in the above-identified patent and that said Letters Patent are hereby corrected as shown below:

ABSTRACT, line 2, change "assembly" to -- supply --

Column 11, line 34, change "transistor" to -- transistors --

Column 13, line 55, delete "which"

Column 15, line 50, change "base" to -- bases --

Column 15, line 60, change "capacitor" to -- capacitors --

Column 16, line 44, after "-500" insert -- volts --

Column 16, line 45, change "a" to -- A --

Column 17, after line 39, after "638" insert -- and capacitors 639 and 691 with filter chokes 692 and 693 --

Signed and Sealed this

Twenty-first Day of December 1976

[SEAL]

Attest:

RUTH C. MASON
*Attesting Officer*

C. MARSHALL DANN
*Commissioner of Patents and Trademarks*